United States Patent
Cardarelli et al.

[11] Patent Number: 5,915,275
[45] Date of Patent: Jun. 22, 1999

[54] OSCILLATING GYROSCOPE

[75] Inventors: Donato Cardarelli, Medfield; Michele Sapuppo, Andover, both of Mass.

[73] Assignee: Milli Sensor and Actuator Systems, Inc., West Newton, Mass.

[21] Appl. No.: 08/884,292

[22] Filed: Jun. 27, 1997

Related U.S. Application Data

[60] Provisional application No. 60/021,077, Jun. 27, 1996.

[51] Int. Cl.$^6$ .............................. G01P 15/14; G01P 9/02
[52] U.S. Cl. .................................. 73/504.03; 73/504.09; 73/510
[58] Field of Search .......................... 73/503.03, 504.02, 73/504.08, 504.09, 504.12, 504.18, 514.01, 514.02, 510; 74/5 R, 5.34

[56] References Cited

U.S. PATENT DOCUMENTS

| | | | |
|---|---|---|---|
| 2,461,521 | 2/1949 | Clopton | 73/503.3 |
| 3,616,699 | 11/1971 | Brand | 73/504.09 |
| 4,598,585 | 7/1986 | Boxenhorn | 73/504.12 |

*Primary Examiner*—Hezron Williams
*Assistant Examiner*—Helen C. Kwok
*Attorney, Agent, or Firm*—Brian M. Dingman

[57] ABSTRACT

An oscillatory gyroscope is described based on a three gimbal structure whose output is the rotary deflection of the middle gimbal. Closed loop operation is achieved by the oscillatory interaction between the outer and inner gimbals. The gyro is referred to as CLOG (Closed Loop Oscillating Gyro). Two variations on the manner of achieving the closed loop are also described. The gyro can be implemented in a three dimensional configuration or in three planar configurations which can be fabricated using modern photolithographic, batch process fabrication technology similar to MEMS.

20 Claims, 4 Drawing Sheets

OSCILLATING GYROSCOPE

CROSS-REFERENCE TO RELATED APPLICATION

This application is a continuation in part of provisional application number 60/021,077, filed on Jun. 27, 1996.

FIELD OF INVENTION

This invention relates to an oscillating, single-degree-of-freedom gyroscope whose output is an angular rotation (not an oscillation). The invention also relates to means for maintaining the output at null (zero rotation) by providing a feedback.

BACKGROUND OF INVENTION

This invention relates to an oscillatory gyroscope that is related to the POGA (Pendulous Oscillating Gyroscopic Accelerometer) disclosed in U.S. Pat. No. 5,457,993 issued on Oct. 17, 1995. The gyro is referred to as a Closed Loop Oscillating Gyroscope (CLOG). Its structure is identical to the POGA without the pendulous mass. Unlike other vibratory gyros, the primary output motion is an angular displacement and not an oscillation.

The CLOG is an attractive concept since it benefits from the development of the POGA. The POGA accelerometer and the CLOG gyro represent the same technology base. A system comprised of these gyros and accelerometers can therefore realize lower fabrication costs and reduced development effort.

In the case of the POGA, a pendulous mass is maintained at null by the counter balance provided by a gyroscopic torque. In the CLOG, the gyro sensing the rotation of the vehicle is counter balanced by an internal, variable gyro. The internal gyro is the gyro of the POGA.

In addition, typical gyroscopes have been based on three dimensional configurations consisting of cylinders of revolution. The CLOG can be achieved in both cylindrical and planar configurations. The planar configurations allow the fabrication using photolithographic means for patterning. The planar fabrication approaches used can lead to size and power reduction and lead to lower costs.

SUMMARY OF INVENTION

It is an object of this invention to devise an oscillatory gyroscope with the inner and outer gimbals of a three gimbal structure which move in sinusoidal oscillations whose output signal is derived from the rotation (non oscillation) of the middle gimbal; all three gimbals move about three axes that are mutually orthogonal.

It is an object of this invention to devise CLOG gyros that can be operated in closed-loop mode by varying the oscillation of the outer gimbal.

It is an object of this invention to devise a three dimensional CLOG using cylinders of revolution.

It is an object of this invention to devise three planar CLOGs.

It is an object of this invention to devise planar structures that are fabricatable using planar technologies based on photolithography that are batch-process able.

It is an object of this invention to devise planar gyroscopes that are flat-pack, multi-layered entities.

This invention features an oscillating gyroscope for detecting motion about an input axis, comprising: a fixed case; a servo driven member mounted to the fixed case, for oscillation about a servo axis; a torque summing member mounted to the servo driven member to allow rotational motion about an output axis corresponding to the gyroscope input axis, and transverse to the servo axis, wherein the rotational motion is induced as a result of gyroscope rotation about the gyroscope input axis; a rotor driven member mounted to the torque summing member for oscillation about a reference axis transverse to both the output axis and the servo axis; first oscillation means for oscillating the rotor driven member about the reference axis; second oscillation means for oscillating the servo driven member about the servo axis; means for sensing at least one aspect of the motion of at least one of the servo driven member and the rotor driven member; and means, responsive to the means for sensing, for determining the rotation of the fixed case about the input axis.

The sensing means may include means for sensing rotational motion of the torque summing member about the output axis. The second oscillation means may be responsive to the means for sensing rotational motion of the gyroscope about the input axis about the output axis. The rotational motion of the gyroscope about the input axis induces oscillatory motion of the servo driven member. The second oscillation means may drive the servo driven member with a motion that is opposite in phase and equal in amplitude to the induced oscillatory motion, to cancel the induced oscillatory motion.

The means for sensing at least one aspect of the motion of the servo driven member and/or the rotor driven member may include means for detecting the amplitude of the oscillatory motion of the servo driven member. The first oscillation means and the second oscillation means may oscillate the rotor driven member and the servo driven member, respectively, at the same oscillation frequency. When the gyroscope is not rotating about the gyroscope input axis, in one embodiment of the invention the oscillations of the rotor driven member and the servo driven member are 90° out of phase.

The second oscillation means in this instance alters the phase of the servo driven member oscillation relative to the phase of the rotor driven member oscillation, to cancel the rotational motion of the torque summing member induced as a result of gyroscope rotation about the gyroscope input axis. The means for sensing at least one aspect of the motion of the servo driven member and/or the rotor driven member may then include means for detecting the phase difference between the oscillations of the servo driven member and of the rotor driven member.

The oscillating gyroscope may further include means for sensing at least one aspect of the oscillatory motion of the rotor driven member; the oscillatory motion aspects sensed of both the rotor driven member and the servo driven member may be oscillation phase, and the means for determining the rotation of the fixed case about the input axis may also be responsive to the means for sensing at least one aspect of the oscillatory motion of the rotor driven member. The oscillatory motion aspects sensed of both the rotor driven member and the servo driven member may include oscillation amplitude.

The first oscillation means may oscillate the rotor driven member at a fixed amplitude, and at a fixed phase, and the second oscillation means may oscillate the servo driven member at a fixed phase 180° different than the fixed phase of the rotor driven member oscillation. The second oscillation means preferably oscillates the servo driven member at resonance.

The means for sensing may include means for determining the angle of rotation of the torque summing member. The means for determining the rotation of the fixed case about the input axis may then be responsive to the means for determining the angle of rotation of the torque summing member.

Featured in a more specific embodiment is a closed-loop oscillating gyroscope for detecting motion about an input axis, comprising: a fixed case; a servo driven member mounted to the fixed case, for oscillation about a servo axis; a torque summing member mounted to the servo driven member to allow rotational motion about an output axis corresponding to the gyroscope input axis, and transverse to the servo axis, wherein the rotational motion is induced as a result of gyroscope rotation about the gyroscope input axis; a rotor driven member mounted to the torque summing member for oscillation about a reference axis transverse to both the output axis and the servo axis; first oscillation means for sinusoidally oscillating the rotor driven member about the reference axis at a first frequency, first phase, and first amplitude; second oscillation means for sinusoidally oscillating the servo driven member about the servo axis at the first frequency and amplitude, and 180° out of phase with the first phase; first sensing means for sensing the amplitude and oscillation phase of the oscillatory motion of the servo driven member; means, responsive to the first sensing means, for determining the rotation of the fixed case about the input axis; second sensing means for sensing rotational motion of the torque summing member about the output axis; wherein the second oscillation means is responsive to the means for sensing rotational motion of the torque summing member about the output axis, and wherein rotational motion about the input axis induces oscillatory motion of the servo driven member in phase with that of the rotor driven member, and in which the second oscillation means in response drives the servo driven member with a motion that is opposite in phase and equal in amplitude to the induced oscillatory motion, to cancel the induced oscillatory motion.

Also featured is a closed-loop oscillating gyroscope for detecting motion about an input axis, comprising; a fixed case; a servo driven member mounted to the fixed case, for oscillation about a servo axis; a torque summing member mounted to the servo driven member to allow rotational motion about an output axis corresponding to the gyroscope input axis, and transverse to the servo axis, wherein the rotational motion is induced as a result of gyroscope rotation about the gyroscope input axis; a rotor driven member mounted to the torque summing member for oscillation about a reference axis transverse to both the output axis and the servo axis; first oscillation means for continuously, sinusoidally oscillating the rotor driven member about the reference axis at a first frequency; second oscillation means for continuously, sinusoidally oscillating the servo driven member about the servo axis, the oscillation being at the first frequency, and 90° out of phase with the oscillation of the rotor driven member, when the gyroscope is not rotating about the gyroscope input axis; first sensing means for detecting the phase difference between the oscillations of the rotor driven member and the servo driven member; means, responsive to the first sensing means, for determining the rotation of the fixed case about the input axis; and second sensing means for sensing rotational motion of the torque summing member about the output axis; wherein the second oscillation means is responsive to the means for sensing rotational motion of the torque summing member about the output axis, and wherein the second oscillation means alters the phase of the servo driven member oscillation relative to the phase of the rotor driven member oscillation, to cancel the rotational motion of the torque summing member induced as a result of gyroscope rotation about the gyroscope input axis.

BRIEF DESCRIPTION OF DRAWINGS

Other objects, features and advantages will occur to those skilled in the art from the following descriptions of the preferred embodiments, and the accompanying drawings, in which.

DESCRIPTION OF THE PREFERRED EMBODIMENTS

Figure 1:
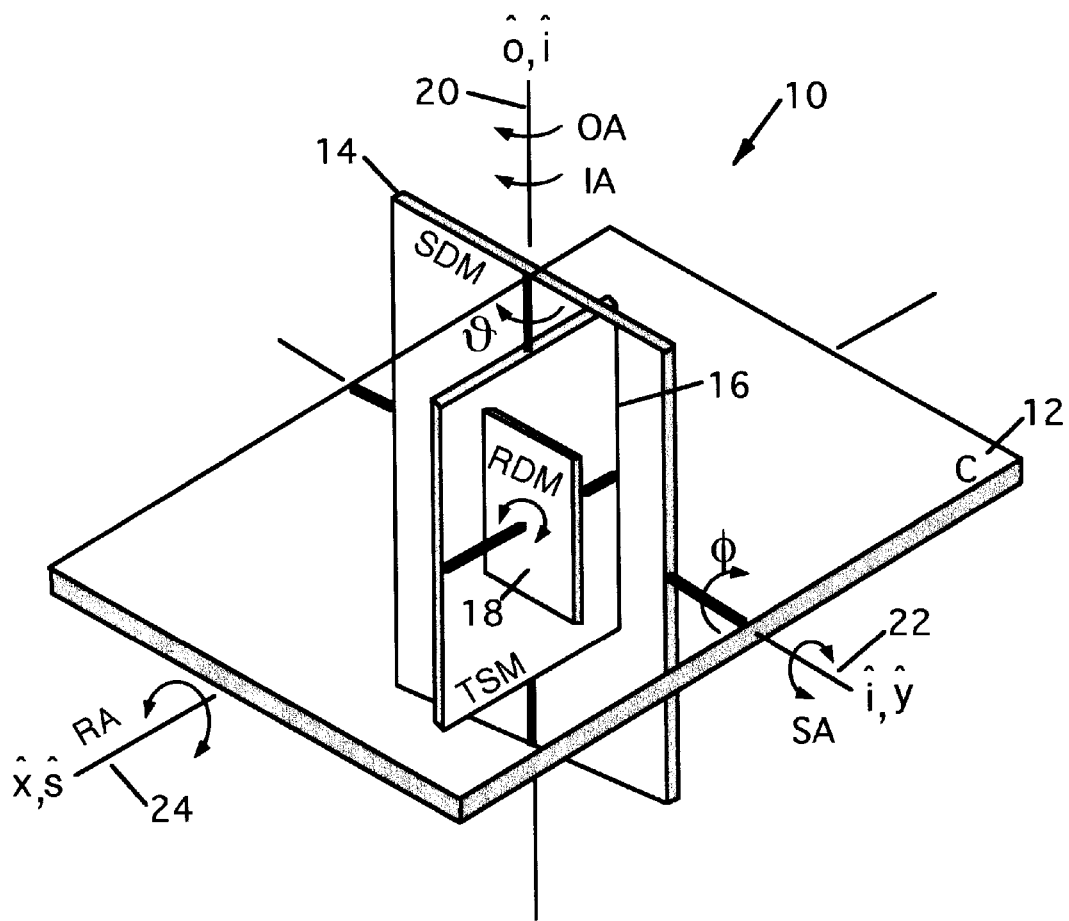
FIG. 1 is a highly schematic drawing of the Closed Loop Oscillating Gyroscope (CLOG) of this invention.

The CLOG 10 can be described with the aid of the stick FIG. 1. It comprises a rotor referred to as a Rotor Driven Member (RDM) 18 that oscillates sinusoidally about the Reference Axis (RA) 24. The RDM is flexurally mounted to the Torque Summing Member (TSM) 16. The TSM is gimballed to the Servo Driven Member (SDM) 14 and rotates by an angle Σ about the Output Axis (OA) 20. The SDM is flexurally mounted to the case 12 which is tied to the vehicle. The SDM oscillates about the Servo Axis (SA) 22 through an angle $\Phi_s$. All three axes, RA, IA and SA are mutually orthogonal. The Input Axis (IA) 20 of the gyro 10 is also along the Output Axis (OA). The manner of connection of the TSM to the SDM can be done flexurally if spring restraint is wanted or with a pivot that is damped.

The Inner Gimbal is also referred to as the RDM, the Middle the TSM and the Outer Gimbal the SDM.

There are essentially two modes of operation based on the manner in which the loop closure is done. These are represented by the names, CLOG 1 and CLOG 2.

Theory of CLOG Operation

During operation, the RDM is oscillated sinusoidally at a frequency through a constant amplitude of angular rotation, on the order of several degrees or less. As the vehicle rotates about the input Axis (IA), the RDM induces an oscillation of the SDM at the same frequency as the RDM oscillation. This is reflected in the equation of motion for the SDM, $$(J_y+I_i)\ddot{\Phi}_S+D_S\dot{\Phi}_S+K_S\Phi_S=-H_R\Omega_{IA}$$

where $\Phi_s$ is the oscillation angle of the SDM, $J_y+I_i$ is the sum of the SDM inertia about the y-axis plus the TSM inertia about the i-axis, $D_S$ is the damping of the SDM to rotation and $K_S$ is the torsional spring stiffness of the SDM flexure.

On the right of the equals sign is given the induced torque which drives the SDM. The relationship with the vehicle rotation rate, $\Omega_{IA}$ and the RDM angular momentum, $H_R$ can be seen.

The angular momentum is given by $$H_R=I_R\dot{\Phi}_R \text{ where } \Phi_R=\Phi_R \cos \omega t \text{ and } \dot{\Phi}_R=-\omega\Phi_R \sin \omega t.$$

$\Phi_R$ is the amplitude of angular motion and ω the frequency of oscillation.

The equation of motion for the TSM is given as, $$I_o[\$]\$''g\ddot{S}+D_T\Sigma+[K_T+\Omega_{IA}\Phi H_R]\Sigma = H_R\dot{\Phi}_S$$

where $I_o$ is the TSM inertia about the output axis, $D_T$ the damping of the TSM, and $K_T$ the torsional spring stiffness of the TSM.

The term on the right of the equals sign is the torque which rotates the TSM. The CLOG requires that the torque be a DC value in order for a non-oscillating rotation to occur. The torque can be determined from the solution of the SDM equation of motion.

The solution of the SDM equation of motion is given by $$\phi_S = \frac{I_R\Omega_{IA}\omega\tilde{\phi}_R}{[D_S^2 + (J_y+I_i)^2(\omega_o^2-\omega^2)^2]^{\frac{1}{2}}}\sin(\omega t - \delta)$$

where $\tan\delta = \frac{D_S\omega}{(J_y+I_i)(\omega_o^2-\omega^2)}$ and $\omega_o^2 = \sqrt{\frac{K_S}{J_y+I_i}}$.

The preferred operation for the SDM is for operation at resonance in order to achieve the maximum response. The solution then occurs for $$\delta = -\frac{\pi}{2}$$

and $\omega=\omega_o$ and is given by $$\phi_S = \frac{I_R\Omega_{IA}\tilde{\phi}_R}{D_S}\cos\omega_o t$$

This expression requires that the RDM oscillation is also done at $\omega=\omega_o$.

The torque on the TSM can now be calculated, $$H_R\dot{\phi}_S = I_R\dot{\phi}_R\dot{\phi}_S = \frac{I_R^2\tilde{\phi}_R^2\omega_o^2}{2D_S}\Omega_{IA}(1-\cos 2\omega_o t)$$

where $\dot{\phi}_S = -\frac{I_R\Omega_{IA}\omega_o\tilde{\phi}_R}{D_S}\sin\omega_o t$.

The torque contains the DC term and a second harmonic which can be ignored. The DC term will rotate the TSM. Note that the RDM and SDM are in phase when the SDM is operated at resonance.

The TSM equation of motion can be written with the DC torque as $$I_o\ddot{\vartheta} + D_T\dot{\vartheta} + [K_T+\Omega_{IA}\phi H_R]\vartheta = \frac{I_R^2\tilde{\phi}_R^2\omega_o^2}{2D_S}\Omega_{IA}$$

The TSM is evaluated to obtain the angle of rotation as a function of TSM torque which is related to vehicle rotation. For a simple case of spring-dominant TSM equation, the solution can be written as $$K_T\vartheta = \frac{I_R^2\tilde{\phi}_R^2\omega_o^2}{2D_S}\Omega_{IA}$$

where the $\Omega_{IA}\Phi H_R$ term has been ignored since it is a second harmonic term.

This last equation is the open loop output for the gyro and relates the TSM rotation angle to the input rotation rate of the vehicle. In spinning wheel gyroscopes this solution relates to a Rate Gyro. For the case where the TSM damping dominates, the solution can be written as $$D_T\dot{\vartheta} = \frac{I_R^2\tilde{\phi}_R^2\omega_o^2}{2D_S}\Omega_{IA}$$

By integration of both sides, we get $$D_T\vartheta = \frac{I_R^2\tilde{\phi}_R^2\omega_o^2}{2D_S}\Theta$$

where $\Theta$ is the angle of rotation of the vehicle which is related to the TSM angle. This is the open loop output for an Integrating Rate Gyro.

Closed Loop Operation for First Mode, CLOG 1

In this first mode, the SDM is not driven in oscillation when the vehicle is not rotating. As the vehicle rotates, an angular oscillation is induced in the SDM at the frequency of the RDM. The amplitude of the motion depends on the rate of rotation of the vehicle. The induced SDM motion and the RDM motion cause the TSM to rotate.

The requirement for loop closure is that the induced motion of the SDM be canceled. This can be done by driving the SDM with an actuator with a motion that is in opposite phase and equal amplitude to that of the induced motion. In other words the total driving torques of the SDM equation of motion need to cancel, or equivalently the motions need to cancel $$\Phi_S(\text{induced})+\Phi_S(\text{drive})=0$$

Assuming an SDM feedback (S-Fb) drive motion described by an amplitude and phase $$\Phi_{S\text{-}Fb}=\Phi_{S\text{-}Fb}\cos(\omega_o t+\delta)$$

then we get $$\frac{I_R\Omega_{IA}}{D_S}\tilde{\phi}_R\cos(\omega_o t) + \tilde{\phi}_{S\text{-}Fb}\cos(\omega_o t+\delta) = 0$$

from which we obtain $$\tilde{\phi}_{S\text{-}Fb} = \frac{I_R}{D_S}\tilde{\phi}_R\Omega_{IA} \text{ and } \delta = \pi.$$

In other words the feedback needs to be of opposite phase and an amplitude given as indicated which is a function of the rate of rotation.

Figure 2:
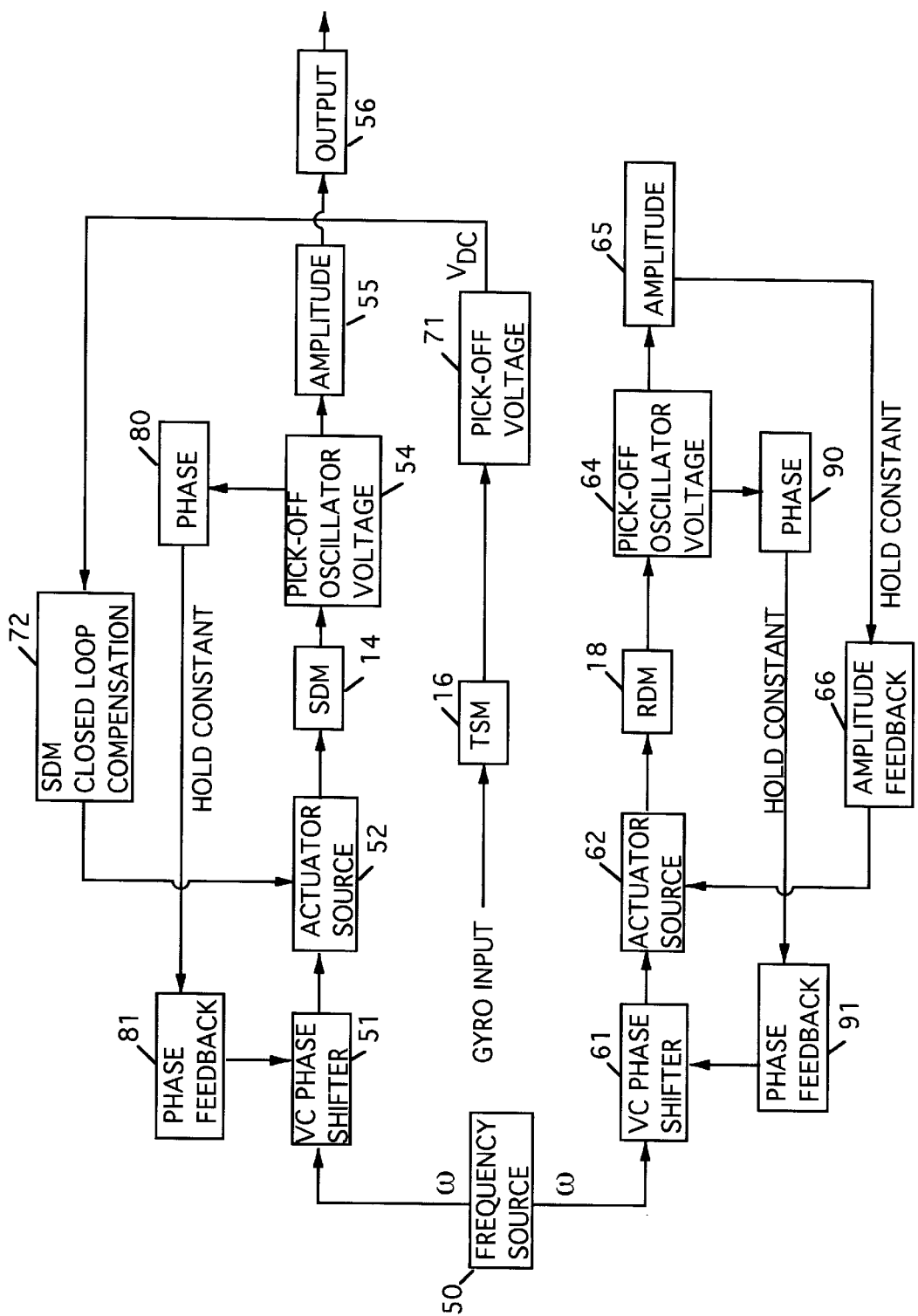
FIG. 2 is a schematic block diagram of the CLOG of FIG. 1 operating in a first closed loop mode.

The control schematic is shown in FIG. 2. A common frequency source 50 is used for the RDM 18 and SDM 14. Voltage controlled phase shifters 51, 61 are used to control the phases. Actuator sources 52, 62 drive the RDM and SDM amplitudes, respectively. The RDM and SDM motions are detected by pick-offs 64 and 54. From them the amplitudes 65 and 55 and phases 90 and 80 are obtained. The RDM phase is maintained constant by a phase loop 90 and 91. The same is true for the SDM phase 80 and 81 but it is held at 180 degrees difference from that of the RDM. The gyro input causes the deflection of the TSM 16. A pick-off 71 provides the signal of the TSM motion and the SDM loop is closed 72 on the SDM amplitude to bring the TSM back to null. The output 56 is the amplitude of the SDM which can be related to the rotation rate as discussed above.

Second mode of operation, CLOG 2

The second mode of operation is different from the first in the way the loop is closed and in the initial set-up. For the second mode, the SDM 14 is oscillated sinusoidally and continuously with the RDM 18 at the same frequency as the RDM. Initially the phase is 90 degrees out of phase with the RDM when the rotation rate is zero. With vehicle rotation, the TSM 16 is rotated by the induced gyro torque.

The requirement for loop closure is for the induced torque which acts on the TSM to be countered by varying the phase of the SDM which is already in oscillation. The second torque is provided by the internal gyro.

The TSM equation of motion becomes $$I_o[|\$]\$\ddot gS + D_T\Sigma + [K_T + \Omega_{IA}\Phi H_R]\Sigma = H_R\dot\Phi_{S-G} - H_R\dot\Phi_{S-Fb}$$

Closure is obtained when $\Sigma = 0$, hence $$H_R\dot\Phi_S(\text{Feedback}) - H_R\dot\Phi_S(\text{Gyro}) = 0$$

or equivalently $$\dot\Phi_S(\text{Feedback}) - \dot\Phi_S(\text{Gyro}) = 0$$

From above, $$\dot\phi_{S-G} = -\frac{\omega_o I_R \tilde\phi_R}{D_S}\Omega_{IA}\sin\omega_o t$$

The SDM motion that is feedback can be written generally as $$\Phi_{S-Fb} = \Phi_{S-Fb}\cos(\omega_o t + \delta)$$

where $\delta$ is the relative phase
between the RDM and SDM oscillations. After calculating it's derivative and equating, we obtain $$\omega_o\tilde\phi_{S-Fb}\sin(\omega_o t + \delta) = \frac{\omega_o I_R \tilde\phi_R}{D_S}\Omega_{IA}\sin\omega_o t$$

from which is obtained $$\Omega_{IA} = \frac{D_S\phi_{S-Fb}}{I_R\tilde\phi_R}\cos\delta$$

which gives a relationship between rotation rate and the phase of the SDM relative to the RDM. The phase was also a feedback variable for the POGA.

Figure 3:
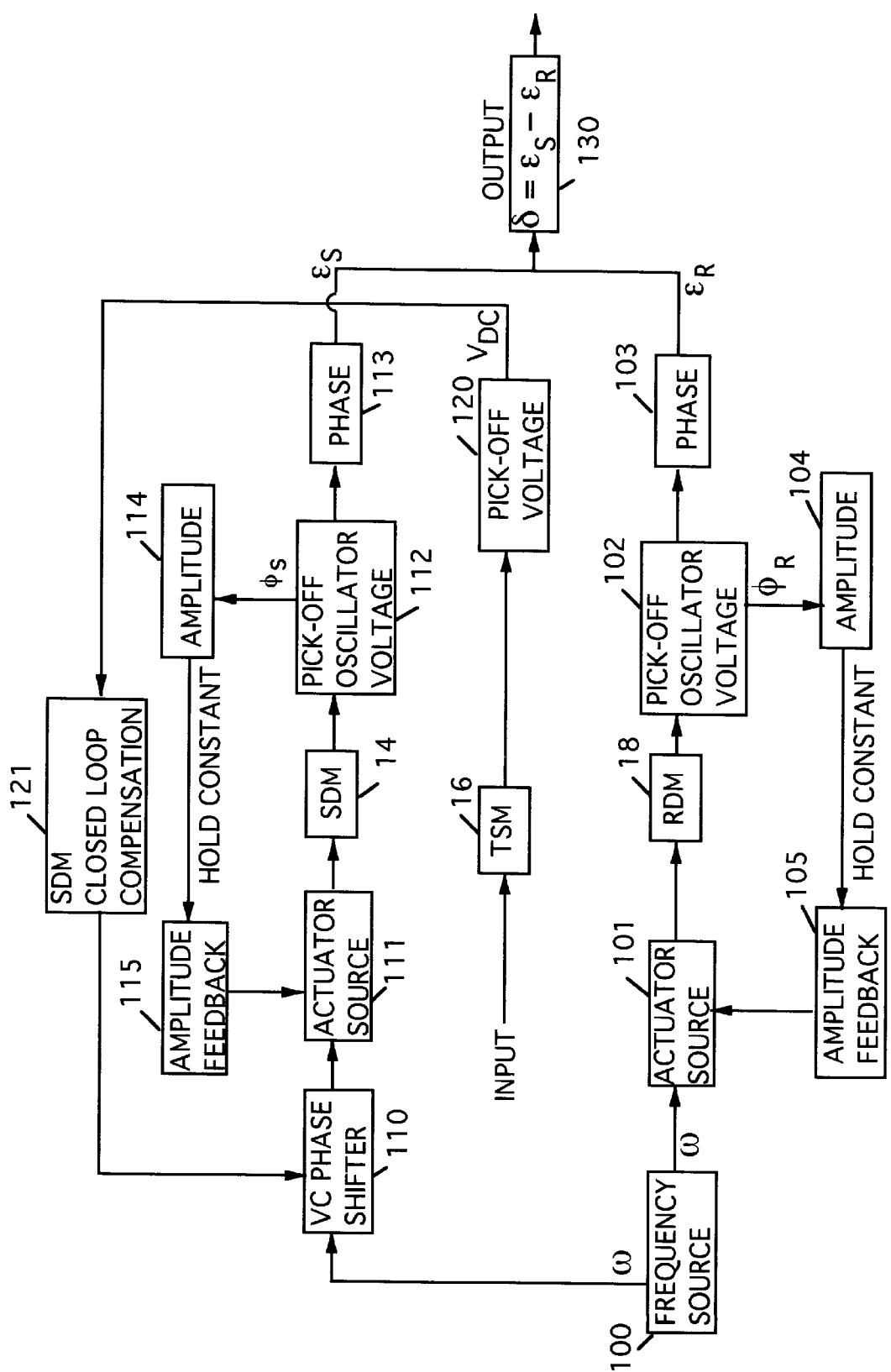
FIG. 3 is a schematic block diagram of the CLOG of FIG. 1 operating in a second, closed loop mode.

The control schematic is shown in FIG. 3. A common frequency source 100 is used to drive both the RDM 18 and SDM 14. A voltage controlled phase shifter 110 controls the phase of the SDM relative to that of the RDM. Actuator sources 101, 111 drive the RDM and SDM amplitudes respectively. The motions of the RDM and SDM are detected by pick-offs 102, 112 from which are obtained amplitudes 104, 114 and phases 103, 113. Amplitude loops 104 and 105 and 114 and 115 hold the RDM and SDM constant. The gyro input deflects the TSM 16 and a pick-off signal 120 is used to feedback 121 to the SDM phase to bring the TSM back to null. The detected phase difference 130 between the RDM and SDM is the output which can be related to gyro rotation rate.

Distinction with POGA

A distinct difference with the POGA is that in the POGA the RDM and SDM motions are set independently and the TSM is caused to rotate by varying the phase between the RDM and SDM motions. In the CLOG the internal gyro used for feedback is run like the POGA, but the induced reaction on the SDM due to vehicle rotation is tied directly to the RDM; in other words, there is a fixed phase between them. The value of the fixed phase can be varied according to the frequency of operation and its relation to the resonance value. For the SDM operation at resonance, the phase difference is zero resulting in maximum sensitivity.

Planar schematics

Figure 4A:
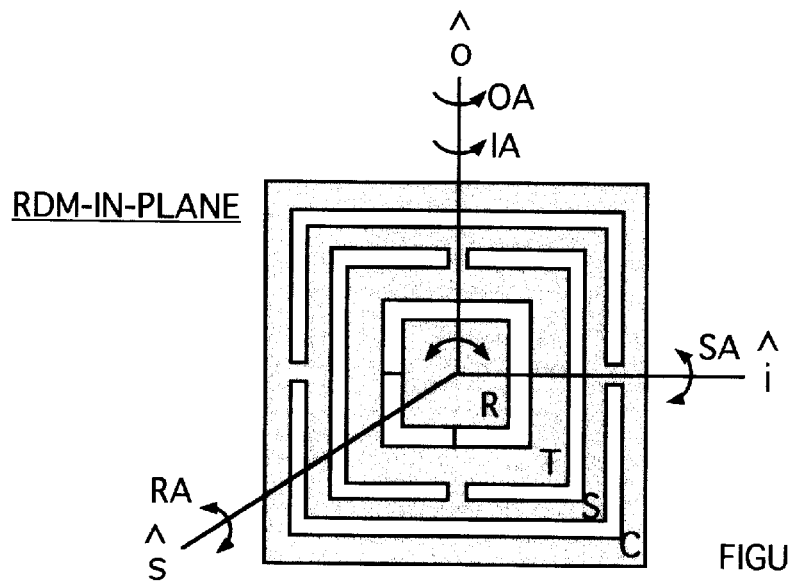
FIGS. 4a–c are schematic diagrams of planar embodiments of the CLOG of this invention.
Figure 4B:
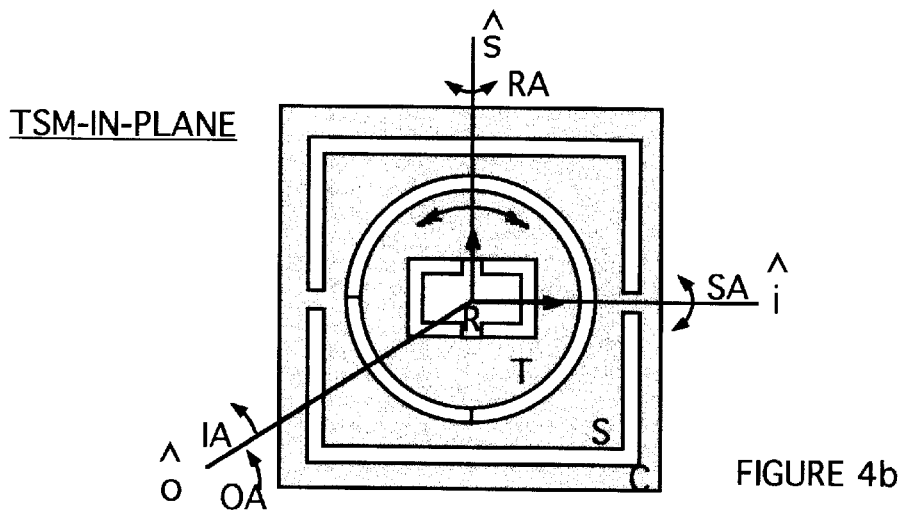
Figure 4C:
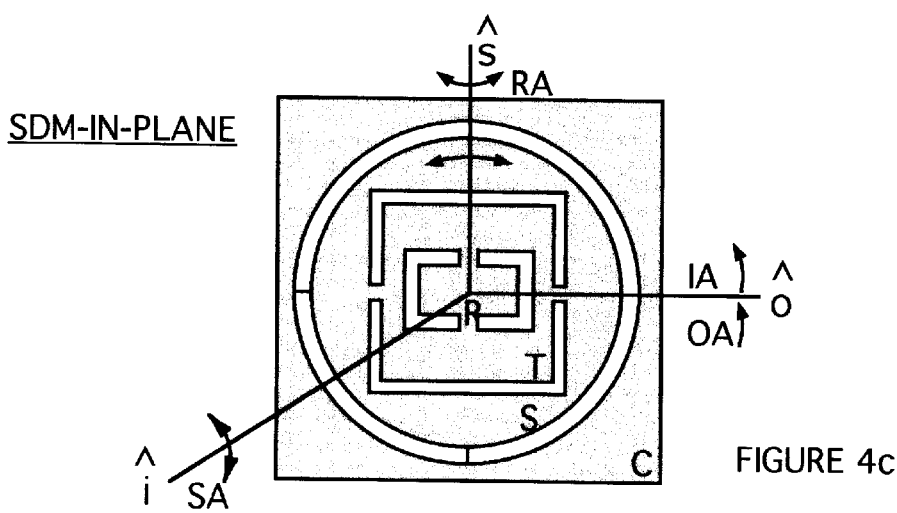

There are three configurations which can be obtained from the stick figure of FIG. 1. They are shown in FIGS. 4a, 4b and 4c. The RDM is labelled "R", TSM is labelled "T" and SDM is labelled "S". They differ by the motion of the three members relative to the plane. The first called RDM in the Plane (FIG. 4a) refers to the motion of the RDM as moving in its plane. The TSM and SDM move in and out of the plane. FIG. 4b shows the TSM-in-Plane and FIG. 4c the SDM-in-Plane. The in-plane motion is accomplished using flexures to connect the appropriate member to another portion of the device as shown.

Actuators

Actuators are used to drive the RDM and SDM in sinusoidal oscillations. Capacitive or electromagnetic components may be used. Such actuators are well known in the field.

Pick-offs

Pick-offs are sensors that detect the motions of the RDM, TSM and SDM. Capacitive, electromagnetic or optical components may be used. Such components are well known in the field.

Non-Resonance Operation for the SDM

The descriptions above relate to the SDM operation at resonance because the induced torque on the TSM is a maximum for that condition. However, operation at another frequency is still possible.

RDM Drive Frequency

The RDM can be driven at resonance or not. Operation at resonance would allow it to be driven at the same amplitude for less power.

Loop Closure with Frequency Feedback

Due to the dynamics of the RDM and SDM, the amplitudes and phases can be varied by the change in common frequency as the frequency is varied relative to the resonance frequency of the SDM and/or RDM.

Although specific features of the invention are shown in some drawings and not others, this is for convenience only, as each feature may be combined with any or all of the other features in accordance with the invention. Other embodiments will occur to those skilled in the art and are within the following claims.

What is claimed is:

1. A closed loop oscillating gyroscope for detecting motion about an input axis, comprising:

a fixed case;

a servo driven member mounted to said fixed case, for oscillation about a servo axis;

a torque summing member mounted to said servo driven member to allow rotational motion about an output axis corresponding to the gyroscope input axis, and transverse to said servo axis, wherein said rotational motion is induced as a result of gyroscope rotation about the gyroscope input axis;

a rotor driven member mounted to said torque summing member for oscillation about a reference axis transverse to both said output axis and said servo axis;

first oscillation means for oscillating said rotor driven member about said reference axis;

second oscillation means for oscillating said servo driven member about said servo axis;

means for sensing at least one aspect of the motion of at least one of said servo driven member and said torque summing member; and means, responsive to said means for sensing, for determining the rotation of said fixed case about the input axis.

2. The closed loop oscillating gyroscope of claim 1 in which said means for sensing includes means for sensing rotational motion of said torque summing member about said output axis.

3. The closed loop oscillating gyroscope of claim 2 in which said second oscillation means is responsive to said means for sensing rotational motion of said torque summing member about said output axis.

4. The closed loop oscillating gyroscope of claim 3 wherein rotational motion of the gyroscope about the input axis induces oscillatory motion of said servo driven member, and in which said second oscillation means drives said servo driven member with a motion that is opposite in phase and equal in amplitude to said induced oscillatory motion, to cancel said induced oscillatory motion.

5. The closed loop oscillating gyroscope of claim 4 in which said means for sensing at least one aspect of the motion of at least one of said servo driven member and said torque summing member includes means for detecting the amplitude of said oscillatory motion of said servo driven member.

6. The closed loop oscillating gyroscope of claim 3 in which said first oscillation means and said second oscillation means oscillate said rotor driven member and said servo driven member, respectively, at the same oscillation frequency.

7. The closed loop oscillating gyroscope of claim 6 in which, when the gyroscope is not rotating about the gyroscope input axis, said oscillations of said rotor driven member and said servo driven member are 90° out of phase.

8. The closed loop oscillating gyroscope of claim 7 in which said second oscillation means alters the phase of the servo driven member oscillation relative to the phase of the rotor driven member oscillation, to cancel rotational motion of said torque summing member induced as a result of gyroscope rotation about the gyroscope input axis.

9. The closed loop oscillating gyroscope of claim 8 in which said means for sensing at least one aspect of the motion of said at least one of said servo driven member and said torque summing member includes means for detecting the phase difference between the oscillations of said servo driven member and of said rotor driven member.

10. The closed loop oscillating gyroscope of claim 1 further including means for sensing at least one aspect of the oscillatory motion of said rotor driven member.

11. The closed loop oscillating gyroscope of claim 10 in which the oscillatory motion aspects sensed of both said rotor driven member and said servo driven member include oscillation phase.

12. The closed loop oscillating gyroscope of claim 10 in which said means for determining the rotation of said fixed case about the input axis is also responsive to said means for sensing at least one aspect of the oscillatory motion of said rotor driven member.

13. The closed loop oscillating gyroscope of claim 10 in which the oscillatory motion aspects sensed of both said rotor driven member and said servo driven member include oscillation amplitude.

14. The closed loop oscillating gyroscope of claim 1 in which said first oscillation means oscillates said rotor driven member at a fixed amplitude.

15. The closed loop oscillating gyroscope of claim 14 in which said first oscillation means oscillates said rotor driven member at a fixed phase, and said second oscillation means oscillates said servo driven member at a fixed phase 180° different than said fixed phase of said rotor driven member oscillation.

16. The closed loop oscillating gyroscope of claim 14 in which said second oscillation means oscillates said servo driven member at resonance.

17. The closed loop oscillating gyroscope of claim 14 in which said means for sensing includes means for determining the angle of rotation of said torque summing member.

18. The closed loop oscillating gyroscope of claim 17 in which said means for determining the rotation of said fixed case about the input axis is responsive to said means for determining the angle of rotation of said torque summing member.

19. A closed-loop oscillating gyroscope for detecting motion about an input axis, comprising:

a fixed case;

a servo driven member mounted to said fixed case, for oscillation about a servo axis;

a torque summing member mounted to said servo driven member to allow rotational motion about an output axis corresponding to the gyroscope input axis, and transverse to said servo axis, wherein said rotational motion is induced as a result of gyroscope rotation about the gyroscope input axis;

a rotor driven member mounted to said torque summing member for oscillation about a reference axis transverse to both said output axis and said servo axis;

first oscillation means for sinusoidally oscillating said rotor driven member about said reference axis at a first frequency, first phase, and a first amplitude;

second oscillation means for sinusoidally oscillating said servo driven member about said servo axis at said first frequency and a second phase 180° different than said first phase, and at said first amplitude;

first sensing means for sensing the amplitude and oscillation phase of the oscillatory motion of said servo driven member;

means, responsive to said first sensing means, for determining the rotation of said fixed case about the input axis;

second sensing means for sensing rotational motion of said torque summing member about said output axis; and wherein said second oscillation means is responsive to said means for sensing rotational motion of said torque summing member about said output axis, and wherein rotational motion about the input axis induces oscillatory motion of said servo driven member in phase with the rotor driven member oscillation, and in which said second oscillation means in response drives said servo driven member with a motion that is opposite in phase and equal in amplitude to said induced oscillatory motion, to cancel said induced oscillatory motion.

20. A closed-loop oscillating gyroscope for detecting motion about an input axis, comprising:

a fixed case;

a servo driven member mounted to said fixed case, for oscillation about a servo axis;

a torque summing member mounted to said servo driven member to allow rotational motion about an output axis corresponding to the gyroscope input axis, and transverse to said servo axis, wherein said rotational motion is induced as a result of gyroscope rotation about the gyroscope input axis;

a rotor driven member mounted to said torque summing member for oscillation about a reference axis transverse to both said output axis and said servo axis;

first oscillation means for continuously, sinusoidally oscillating said rotor driven member about said reference axis at a first frequency;

second oscillation means for continuously, sinusoidally oscillating said servo driven member about said servo axis, the oscillation being at said first frequency, and 90° out of phase with the oscillation of said rotor driven member, when the gyroscope is not rotating about the gyroscope input axis;

first sensing means for detecting the phase difference between the oscillations of said rotor driven member and said servo driven member;

means, responsive to said first sensing means, for determining the rotation of said fixed case about the input axis; and second sensing means for sensing rotational motion of said torque summing member about said output axis;

wherein said second oscillation means is responsive to said means for sensing rotational motion of said torque summing member about said output axis, and wherein said second oscillation means alters the phase of the servo driven member oscillation relative to the phase of the rotor driven member oscillation, to cancel said rotational motion of said torque summing member induced as a result of gyroscope rotation about the gyroscope input axis.

* * * * *